United States Patent
Nishikawa et al.

(10) Patent No.: US 9,550,342 B2
(45) Date of Patent: Jan. 24, 2017

(54) TIAL JOINED BODY AND MANUFACTURING METHOD FOR TIAL JOINED BODY

(71) Applicant: MITSUBISHI HEAVY INDUSTRIES, LTD., Tokyo (JP)

(72) Inventors: Kosuke Nishikawa, Tokyo (JP); Noriyuki Hiramatsu, Tokyo (JP); Akira Fukushima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 116 days.

(21) Appl. No.: 14/064,438

(22) Filed: Oct. 28, 2013

(65) Prior Publication Data

US 2015/0044505 A1 Feb. 12, 2015

(30) Foreign Application Priority Data

Aug. 12, 2013 (JP) .................. 2013-167260

(51) Int. Cl.

| | |
|---|---|
| *B23K 20/00* | (2006.01) |
| *B23K 20/22* | (2006.01) |
| *B32B 15/01* | (2006.01) |
| *B23K 1/19* | (2006.01) |
| *B23K 35/32* | (2006.01) |
| *B23K 35/02* | (2006.01) |
| *C22C 14/00* | (2006.01) |
| *F01D 9/04* | (2006.01) |

(52) U.S. Cl.
CPC .............. *B32B 15/016* (2013.01); *B23K 1/19* (2013.01); *B23K 35/025* (2013.01); *B23K 35/0233* (2013.01); *B23K 35/325* (2013.01); *B32B 15/01* (2013.01); *C22C 14/00* (2013.01); *F01D 9/044* (2013.01); *B23K 2203/10* (2013.01); *B23K 2203/14* (2013.01); *F05D 2230/238* (2013.01); *F05D 2300/174* (2013.01); *F05D 2300/1723* (2013.01); *Y02T 50/671* (2013.01); *Y10T 428/12806* (2015.01)

(58) Field of Classification Search
CPC .............. B23K 35/325; B23K 2203/14; B23K 35/0238; B23K 35/302; B23K 35/3033; B23K 35/32; B32B 2311/12; B32B 2311/18; B32B 2311/22; B32B 37/20; B32B 15/01
USPC .................................................. 228/193, 194
See application file for complete search history.

(56) References Cited

U.S. PATENT DOCUMENTS

| | | | |
|---|---|---|---|
| 4,780,374 A | * | 10/1988 | Mizuhara ...................... 428/660 |
| 5,863,670 A | | 1/1999 | Taguchi et al. |

FOREIGN PATENT DOCUMENTS

| | | |
|---|---|---|
| JP | 04-367382 | 12/1992 |
| JP | 3459138 | 10/2003 |

* cited by examiner

*Primary Examiner* — Erin Saad
(74) *Attorney, Agent, or Firm* — Wenderoth, Lind & Ponack, L.L.P.

(57) ABSTRACT

A manufacturing method of a TiAl joined body includes: an arranging step and a heating step. The arranging step is a step of arranging a plurality of members which contains a TiAl intermetallic compound and insert materials which contain Ti as a major element, Cu and Ni such that each of the insert materials is inserted between two adjacent members of the plurality of members. The heating step is a step of heating the plurality of members and the insert materials in a non-oxidizing atmosphere at a temperature above melting points of the insert materials and below melting points of the plurality of members.

13 Claims, 6 Drawing Sheets

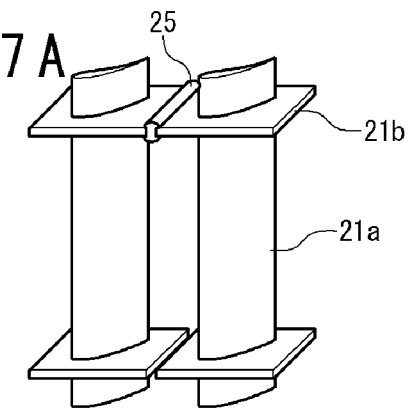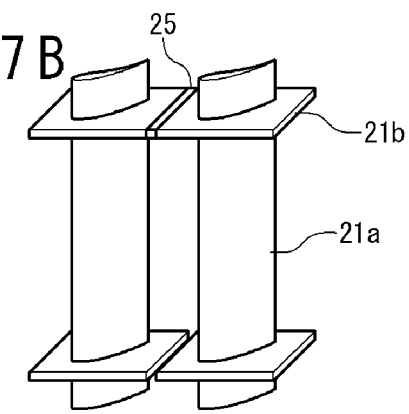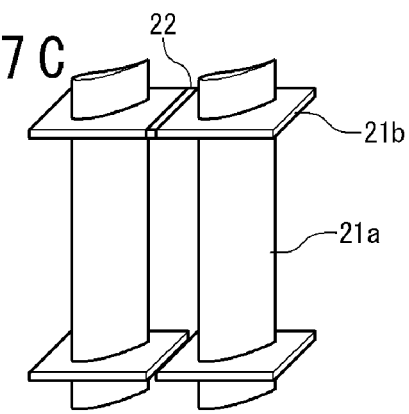

TIAL JOINED BODY AND MANUFACTURING METHOD FOR TIAL JOINED BODY

INCORPORATION BY REFERENCE

This application is based upon and claims the benefit of priority from Japanese patent application No. 2013-167260, filed in Japan on Aug. 12, 2013, the disclosure of which is incorporated herein in its entirety by reference.

TECHNICAL FIELD

The present invention relates to a TiAl joined body and a manufacturing method of a TiAl joined body.

BACKGROUND ART

A TiAl intermetallic compound (also simply referred to as TiAl) is known as light material with heat resistance. TiAl is preferable as material for parts of a missile and parts of an aerospace engine which are required to be light and heat-resistant, for example. When TiAl is used as the material for such parts, there is a case that TiAl needs to be joined. In that case, a joining portion is required to have high-temperature strength equal to a TiAl base material.

As a method of obtaining a joining portion having high-temperature strength equal to a TiAl base material, diffusion bonding is mainly used since welding is not applicable. In the diffusion bonding, a heating temperature, a heating time, a pressure applying method, magnitude of an applied pressure, presence of an insert material and so on are set as parameters. For example, Japanese Patent Publication JP Heisei 4-367382A (Patent Document 1) discloses a high-strength TiAl joined body and a joining method thereof. FIG. 1A and FIG. 1B are schematic views showing a TiAl joining method according to the conventional technique. FIG. 1A shows a joining method according to Japanese Patent Publication JP Heisei 4-367382A and FIG. 1B shows a joining method according to a conventional technique at the time of applying the Japanese Patent Publication JP Heisei 4-367382A. In the joining method in FIG. 1B, diffusion bonding is performed by applying pressure to TiAl intermetallic compounds 101 while heating the TiAl intermetallic compounds 101 with heaters 102. On the other hand, in the joining method in FIG. 1A, metal Ti 103 is used as an insert material, which is different from FIG. 1B, when diffusion bonding is performed by applying pressure to TiAl intermetallic compounds 101 while heating the TiAl intermetallic compounds 101 with heaters 102.

As a related technique, Japanese Patent JP 3459138B (Patent Document 2; corresponding to U.S. Pat. No. 5,863,670(A)) discloses a TiAl intermetallic compound joined body and a manufacturing method thereof. The manufacturing method of the TiAl intermetallic compound joined body is characterized in that: an insert material of which a main component is a mixture of metal phases containing Al and Ti as major elements is positioned to a faying surface of two base materials of a TiAl intermetallic compound and are heated in a temperature range where the insert material become a TiAl intermetallic compound such that reaction synthesis joining is performed; and after the reaction synthesis joining process, heat treatment is performed in which the joined body is held in a temperature range of $T\alpha$ to $(T\alpha-100)$ degrees Celsius ($T\alpha$ is a temperature at which a $\gamma$-phase is precipitated from a $\alpha$-phase) for a predetermined time, or heat treatment is performed in which the joined body is heated to the temperature of $(T\alpha+100)$ to $T\alpha$ degrees Celsius and further held in a temperature range of $T\alpha$ to $(T\alpha-100)$ degrees Celsius for a predetermined time, when the base materials contain mixed structure of $\gamma$-phase equi-axed grains and a lamellar structure having alternately-laminated plate-like $\gamma$ grains and plate-like $\alpha_2$ grains.

As mentioned above, it is necessary to actively apply pressure to TiAl as shown in FIG. 1A and FIG. 1B, in order to obtain good joining property (e.g. joint strength equivalent of a base material) when diffusion bonding of TiAl is performed. This is because surfaces of TiAl to be joined need to closely come into contact with each other. Here, pressure to be required can be reduced to some extent by inserting an insert material (Ti, and Al and Ti) (Japanese Patent Publication JP Heisei 4-367382A and Japanese Patent JP 3459138B.

CITATION LIST

Patent Literature

[PTL 1] Japanese Patent Publication JP Heisei 04-367382A
[PTL 2] Japanese Patent JP 3459138B

SUMMARY OF THE INVENTION

We have now discovered the following facts.

In the techniques disclosed in the above patent literatures, pressure is actively applied to TiAl during TiAl diffusion bonding to make the surfaces of TiAl to be joined closely come into contact with each other, in each case. For parts having shapes to which pressure is difficult to be applied, since pressure cannot be uniformly applied to surfaces to be joined, it is difficult to use the techniques disclosed in the above patent literatures. For parts having surfaces to be joined with a large area, since pressure applied to the surfaces to be joined is much too high, it is difficult to use the techniques disclosed in the above patent literatures. A technique is desired to obtain a joining portion which has high-temperature strength equal to a TiAl base material without depending on a shape and an area.

Therefore, an object of the present invention is to provide a TiAl joined body and a manufacturing method of a TiAl joined body in which a joining portion which has high-temperature strength equal to a TiAl base material can be obtained without depending on a shape and an area. Another object of the present invention is to provide a TiAl joined body and a manufacturing method of a TiAl joined body in which a joining portion which has high-temperature strength equal to a TiAl base material can be obtained without actively applying pressure to TiAl.

This and other objects, features and advantages of the present invention will be readily ascertained by referring to the following description and drawings.

In order to achieve an aspect of the present invention, the present invention provides a manufacturing method of a TiAl joined body includes: arranging a plurality of members which contains a TiAl intermetallic compound and insert materials which contain Ti as a major element, Cu and Ni such that each of the insert materials is inserted between two adjacent members of the plurality of members;

and heating the plurality of members and the insert materials in a non-oxidizing atmosphere at a temperature above melting points of the insert materials and below melting points of the plurality of members.

In the manufacturing method of a TiAl joined body, the heating step is performed without actively applying pressure to the plurality of members.

In the manufacturing method of a TiAl joined body, each of the insert materials includes one of a lamination material in which Ti foil, Cu foil and Ni foil are laminated, a lamination material in which Ti foil and Cu—Ni foil are laminated and Ti—Cu—Ni foil.

In the manufacturing method of a TiAl joined body, in the arranging step, each of the insert materials is pressed by one of the two adjacent members to the other of the two adjacent members by using own weight of the one of the two adjacent members.

In the manufacturing method of a TiAl joined body, each of the insert materials includes paste which includes a powdered brazing filler metal containing Ti, Cu and Ni.

In the manufacturing method of a TiAl joined body, in the arranging step, each of the insert materials is inserted and supported in a predetermined clearance between the two adjacent members.

In the manufacturing method of a TiAl joined body, each of the plurality of members contains Al of 35 to 55 at. %. Each of the insert materials contains Cu of 5 to 20 wt % and Ni of 5 to 20 wt %. The heating step is performed in heating temperature of 1000 to 1250 degrees Celsius.

In the manufacturing method of a TiAl joined body, each of the plurality of members is cylindrically-shaped or ring-shaped.

In order to achieve an another aspect of the present invention, the present invention provides a TiAl joined body includes: a plurality of members configured to contain a TiAl intermetallic compound; and joining layers, each of which configured to be formed along a faying surface between two adjacent members of the plurality of members. Each of joining layers includes: a first diffusion layer configured to be formed on a side of one of the two adjacent members; and a second diffusion layer configured to be formed on a side of the other of the two adjacent members. The first diffusion layer and the second diffusion layer contain Cu and Ni, and contain at least one of an α-phase Ti-based metal and a β-phase Ti-based metal.

In the TiAl joined body, each of the plurality of members contains: Al of 35 to 55 at. %. The highest concentration of each of Cu and Ni is approximately 2 to 3 wt % in each of the first diffusion layer and the second diffusion layer.

In the TiAl joined body, each of the first diffusion layer and the second diffusion layer has an acicular structure.

In the TiAl joined body, a ratio of Cu becomes smaller at a farther portion from the faying surface. The ratio of Ni becomes smaller at a farther portion from the faying surface. The ratio of Al becomes larger at a farther portion from the faying surface.

In the TiAl joined body, each of the plurality of members is cylindrically-shaped or ring-shaped.

According to the present invention, a joining portion which has high-temperature strength equal to a TiAl base material can be obtained without depending on a shape and an area. In addition, a joining portion which has high-temperature strength equal to a TiAl base material can be obtained without actively applying pressure to TiAl.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 7A is a perspective view showing an example of a manufacturing method for a TiAl joined body according to the second embodiment of the present invention;

FIG. 7B is a perspective view showing the example of the manufacturing method for a TiAl joined body according to the second embodiment of the present invention; and FIG. 7C is a perspective view showing the example of the manufacturing method for a TiAl joined body according to the second embodiment of the present invention.

DESCRIPTION OF PREFERRED EMBODIMENTS

A TiAl joined body and a manufacturing method of a TiAl joined body according to embodiments of the present invention will be described below with reference to the attached drawings.

First Embodiment

First, a structure of a TiAl joined body according to the first embodiment of the present invention will be described.

Figure 1A:
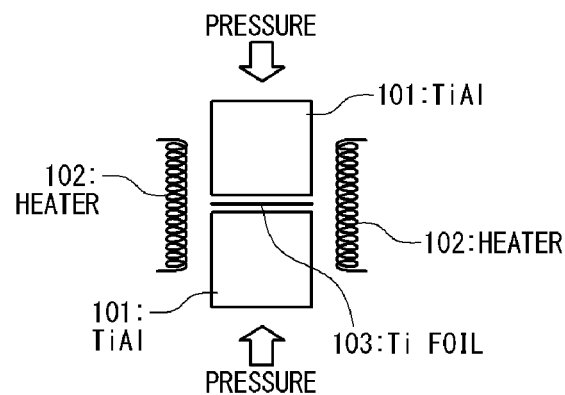
FIG. 1A is a schematic view showing a conventional TiAl joining method.
Figure 1B:
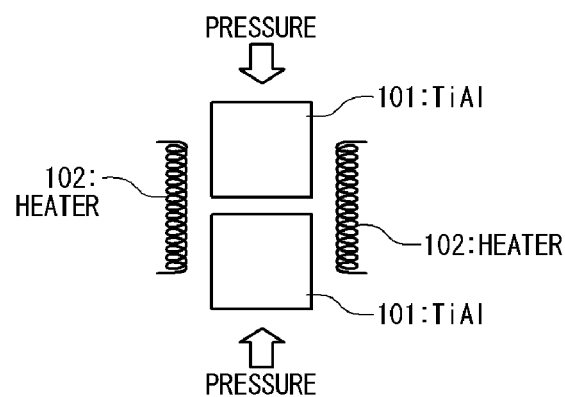
FIG. 1B is a schematic view showing a conventional TiAl joining method.
Figure 2:
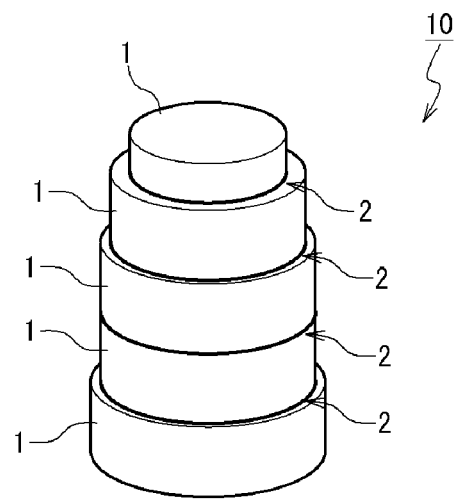
FIG. 2 is a perspective view showing an example of a structure of a TiAl joined body according to a first embodiment of the present invention.

FIG. 2 is a perspective view showing a structure example of a TiAl joined body according to the first embodiment of the present invention. A joined body 10 has the structure in which a plurality of members 1 is joined through joining layers 2. FIG. 2 shows the example where five cylindrically-shaped (ring-shaped) members 1 are stacked. A radial thickness portion of a cylinder (ring) is provided so as to overlap radial thickness portions of upper and lower cylinders (rings) and be in surface contact with the upper and lower cylinders (rings) at joining portions. In the present embodiment as mentioned above, the members 1 may be stacked and may have different diameters. As for the size of the joined body 10, the diameter of a cylinder (ring) is approximately ϕ600 mm and the height of the five stacked cylinders is approximately 1000 mm for example. Note that the present embodiment is not limited to this example. For example, if the members 1 can be joined through the joining layers 2, the members 1 are not required to be cylindrically-shaped, nor the members 1 to be joined are not required to have the same or similar shapes.

The member 1 is a member composed of a TiAl intermetallic compound (also simply referred to as TiAl) or a member containing TiAl as a major element. Note that the major element means an element that is contained most. TiAl of the member 1 contains a γ-phase, a β-phase and an α2/γ-lamellar phase. The member 1 may have any composition if the member 1 having the composition shows the properties of heat resistance and light weight. Al is preferably 35 to 55 at. % and Ti is preferably 45 to 65 at. %. Elements such as Mn, Nb and Cr may be added to the foregoing, in order to improve the properties. Specific examples of the composition are as follows. Al:Ti=40:60 (at. %), Al:Ti=48:52 (at. %), Al:Ti:Mn=35:59:6 (at. %), and Al:Ti:Nb:Cr=46:50:2:2 (at. %).

Figure 3:
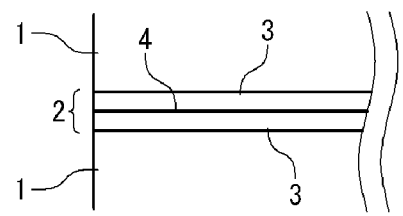
FIG. 3 is a sectional view showing a structure of a joining layer according to the first embodiment of the present invention.

The joining layer 2 is provided along a faying surface 4 between one member 1 and the other member 1 (the boundary between one member 1 and the other member 1), and joins the members 1. FIG. 3 is a sectional view showing a structure of the joining layer 2. The joining layer 2 has a diffusion layer 3 formed on the side of one joined member 1 and a diffusion layer 3 formed on the side of the other member 1. The diffusion layer 3 has acicular structure (acicular crystals). The diffusion layer 3 includes at least one of an α-phase Ti-based metal and a β-phase Ti-based metal, and contains Cu, Ni and Al inside. The ratio of Cu is approximately 2 to 3 wt % at a portion where Cu is contained most for example, and becomes smaller at a farther portion from the faying surface 4. Similarly, the ratio of Ni is approximately 2 to 3 wt % at a portion where Ni is contained most for example, and becomes smaller at a farther portion from the faying surface 4. The ratio of Al becomes larger at a farther portion from the faying surface 4 and continues into the ratio of Al in the member 1. By making the joining layer 2 where Cu, Ni and Al are interdiffused as mentioned above, good joining properties can be obtained. The width of the diffusion layer 3 is approximately 500 μm for example.

Next, a manufacturing method of a TiAl joined body according to the first embodiment of the present invention will be described.

Figure 4A:
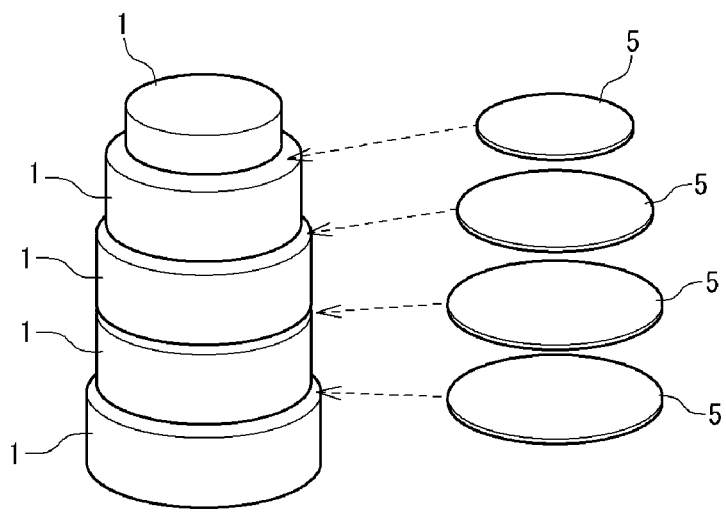
FIG. 4A is a perspective view showing an example of a manufacturing method of a TiAl joined body according to the first embodiment of the present invention.
Figure 4B:
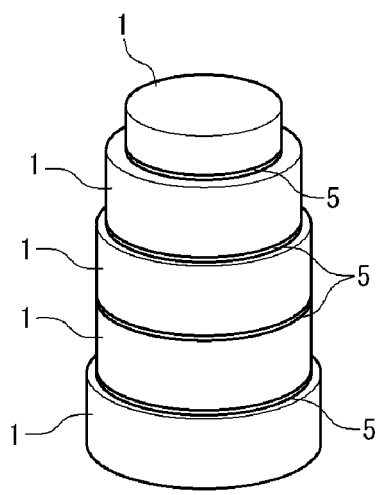
FIG. 4B is a perspective view showing the example of the manufacturing method for a TiAl joined body according to the first embodiment of the present invention.
Figure 4C:
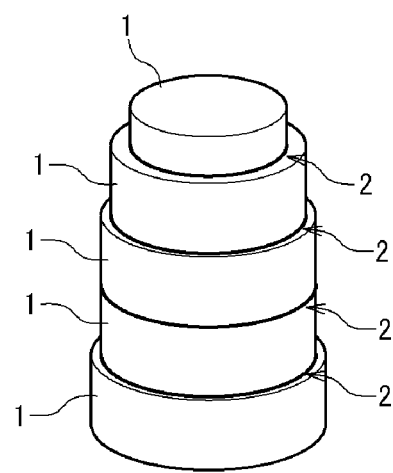
FIG. 4C is a perspective view showing the example of the manufacturing method for a TiAl joined body according to the first embodiment of the present invention.

FIGS. 4A to 4C are perspective views showing an example of the manufacturing method of a TiAl joined body according to the first embodiment of the present invention.

As shown in FIG. 4A, the plurality of members 1 which is composed of TiAl intermetallic compound or which contains TiAl intermetallic compound as a major element is provided first. Next, a plate-like insert material 5 is arranged so as to be sandwiched between two adjacent members 1. That is, the insert material 5 is inserted between two adjacent members 1. As a result, the insert material 5 is pressed against the facing two surfaces of the two adjacent members 1 due to the own weight of the member 1 put on the insert material 5. Note that pressure is not actively applied to the members 1. That is to say, active application of pressure is not necessary.

Here, the member 1 is as described in FIG. 2.

The insert material 5 contains Cu and Ni in addition to Ti which is a major element. The ratio of Cu is 3.85 to 16.5 at. % (5 to 20 wt %). The ratio of Ni is 4.15 to 17.9 at. % (5 to 20 wt %). A specific example of the composition is, Ti:Cu:Ni=92.0:3.85:4.15 (at. %), to 65.6:16.5:17.9 (at. %). Such composition shows a preferable range for diffusing Cu and Ni into the members 1 without applying pressure so that the joining layer 2 having good joining property can be formed. The size and shape of the insert material 5 are approximately the same as the size and shape of the surfaces coming into contact with each other of two adjacent members 1. Note that "approximately the same" means that the size and shape are the same by taking into account of manufacturing errors. In this example, the insert material 5 is circular-shaped, and may be ring-shaped.

An example of the insert material 5 is Ti—Cu—Ni foil having the above composition. Note that the Ti—Cu—Ni foil is not limited to Ti—Cu—Ni alloy foil. If the above-mentioned composition can be achieved after melting, the foil may be used in which foil of a Cu—Ni solid solution is put between a plurality of pieces of Ti foil, in which foil of a Cu—Ni solid solution is cladded between a plurality of pieces of Ti foil, or in which Cu foil and Ni foil are laminated in moderate quantities between a plurality of pieces of Ti foil. It is preferable that the insert material 5 have the thickness such that the melted insert material 5 can at least fill in irregularities of the surfaces of the members 1 when the insert material 5 is melted. However, it is preferable that the insert material 5 is not excessively thick since a time taking for the formation of the diffusion layer 3 is increased as the thickness is increased. For example, the thickness is 50 to 150 μm. When an area of a connecting surface of the member 1 is excessively large, not a single sheet of foil but a plurality of sheets of foil may be pieced together.

Next, the plurality of members 1 where each of the insert materials 5 is put between two adjacent members 1 are heated in a non-oxidizing atmosphere (an inert atmosphere or a vacuum) as shown in FIG. 4B. An example is heating in a vacuum. As for a heating treatment condition to aim at transient liquid phase bonding, a liquid phase generated due to melting of the insert material 5 at temperature above the melting point of the insert material 5 and below the melting point of the member 1, should be isothermally solidified after Cu and Ni in the liquid phase diffuse into the member 1 during temperature holding time and the melting point of the liquid phase increases. Considering that the melting point of TiAl is approximately 1400 to 1500 degrees Celsius and that the melting points of Ti—Cu and Ti—Ni are approximately 900 degrees Celsius, the heating treatment condition is as follows for example.

Heating temperature: 1000 to 1250 degrees Celsius
Holding time: 10 minutes to 10 hours
Degree of vacuum: vacuum higher than $10^{-3}$ Pa As a result, the joining layers 2 are formed between the two adjacent members 1 through isothermal solidification and cooled thereafter as shown in FIG. 4C. Consequently, a TiAl joined body, in which TiAl as the members 1 are joined together, is manufactured.

In the present embodiment as mentioned above, a liquid phase is generated between the members 1 by performing heating in a vacuum furnace for example at the temperature above the melting point of the insert material 5 and below the melting point of the member 1 and by using the eutectic reaction of Ti—Cu and Ti—Ni of the insert material 5. Diffusion of substances of the liquid phase into the members 1 makes it possible to join the members 1 without active pressurizing force. As a result, it is possible to obtain the joint strength equivalent of a base material from room temperature to high temperature of 1050 degrees Celsius by properly taking a heating treatment condition.

That is to say, in the present embodiment, active pressurizing is not necessary by generating a liquid phase between the members to be joined. Consequently, joining of materials with the shape which is difficult to be pressurized and joining of materials with the shape which has large areas become possible only by inserting an insert material between members to fit with the surfaces to be joined. In addition, three or more members can be joined at the same time by stacking a plurality of members with insert materials being put or sandwiched therebetween. As a result, a TiAl intermetallic compound, which is difficult to be manufactured as casting parts and forged parts in large-scale, becomes applicable to large-size structural members.

Second Embodiment

First, a structure of a TiAl joined body according to the second embodiment of the present invention will be described.

Figure 5:
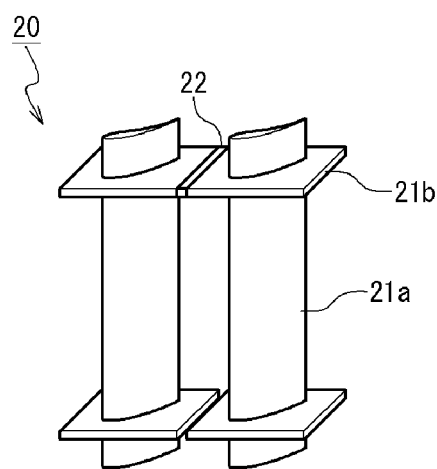
FIG. 5 is a perspective view showing an example of a structure of a TiAl joined body according to a second embodiment of the present invention.

FIG. 5 is a perspective view showing an example of the structure of a TiAl joined body according to the second embodiment of the present invention. A joined body 20 has the structure in which a plurality of turbine blades (turbine blade bodies 21a and shrouds 21b) as members is joined through a joining layer 22. Specifically, the shroud 21b provided to the turbine blade body 21a is joined to the adjacent shroud 21b through the joining layer 22. In the example shown in FIG. 5, the plate-like shrouds 21b of the turbine blades are adjacent to each other. Note that the present embodiment is not limited to this example. If the parts can be joined, for example, the shrouds 21b are not required to be plate-like, nor the parts to be joined are not required to have the same or similar shapes.

The shroud 21b (and the turbine blade body 21a) is a member composed of a TiAl intermetallic compound (also simply referred to as TiAl) or a member containing TiAl as a major element. TiAl of the shroud 21b contains a γ-phase, a β-phase, and an α2/γ-lamellar phase. The shroud 21b may have any composition provided that the composition shows the properties of heat resistance and light weight. Al is preferably 35 to 55 at. % and Ti is preferably 45 to 65 at. %. Elements such as Mn, Nb and Cr may be added to the foregoing, in order to improve the properties. Specific examples of the composition are as follows. Al:Ti=40:60 (at. %), Al:Ti=48:52 (at. %), Al:Ti:Mn=35:59:6 (at. %), and Al:Ti:Nb:Cr=46:50:2:2 (at. %).

Figure 6:
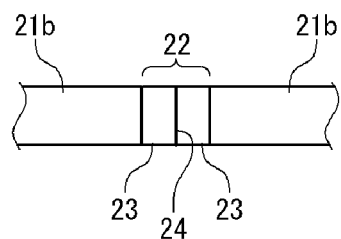
FIG. 6 is a sectional view showing a structure of a joining layer according to the second embodiment of the present invention.

The joining layer 22 is provided along a faying surface 24 (the boundary between the shroud 21b and the shroud 21b) between the shroud 21b and the shroud 21b, and joins the shrouds 21b. FIG. 6 is a sectional view showing the structure of the joining layer 22. The joining layer 22 has a diffusion layer 23 formed on the side of one joined shroud 21b and a diffusion layer 23 formed on the side of the other shroud 21b. The diffusion layer 23 has a circular structure (acicular crystals). The diffusion layer 23 includes at least one of α-phase and β-phase Ti-based metals, and contains Cu, Ni and Al inside. The ratio of Cu is approximately 2 to 3 wt % at a portion where Cu is contained most for example, and becomes smaller at a farther portion from the faying surface 24. Similarly, the ratio of Ni is approximately 2 to 3 wt % at a portion where Ni is contained most for example, and becomes smaller at a farther portion from the faying surface 24. The ratio of Al becomes larger at the farther portion from the faying surface 24 and continues into the ratio of Al in the shroud 21b. By making the joining layer 22 where Cu, Ni and Al are interdiffused as mentioned above, good joining properties can be obtained.

Next, a manufacturing method of a TiAl joined body according to the second embodiment of the present invention will be described.

FIGS. 7A to 7C are perspective views showing an example of the manufacturing method of a TiAl joined body according to the second embodiment of the present invention.

As shown in FIG. 7A, first, the plurality of turbine blades (the turbine blade bodies 21a and the shrouds 21b) as the members is provided. At this time, at least the shroud 21b is composed of a TiAl intermetallic compound or contains a TiAl intermetallic compound as a major element. A clearance between two adjacent shrouds 21b is 20 to 50 µm for example. Next, paste 25 of powdered brazing filler metal as insert material is applied (arranged) such that the clearance between two adjacent shrouds 21b is filled with the paste 25. Note that pressure is not actively applied to the plurality of turbine blades (or the shrouds 21b and so forth). That is to say, active application of pressure is not necessary.

Here, the shrouds 21b are as described in FIG. 5.

The paste 25 as the insert material is a paste form material made by adding an organic solvent binder to a powdered brazing filler metal containing Ti as a major element, Cu and Ni, for giving viscosity. The ratio of Cu in the powdered brazing filler metal is 3.85 to 16.5 at. % (5 to 20 wt %). The ratio of Ni is 4.15 to 17.9 at. % (5 to 20 wt %). A specific example of the composition is, Ti:Cu:Ni=92.0:3.85:4.15 (at. %) to 65.6:16.5:17.9 (at. %). Such composition shows a preferable range for diffusing Cu and Ni into the shrouds 21b without applying pressure so that the joining layer 22 having good joining property can be formed.

Next, as shown in FIG. 7B, the plurality of turbine blades (the turbine blade bodies 21a and the shrouds 21b) with the paste 25 between the two adjacent shrouds 21b are heated in a non-oxidizing atmosphere (an inert atmosphere or a vacuum), causing the brazing filler metal melted in the clearance between the two adjacent shrouds 21b to be absorbed due to the capillary action. As for a heating treatment condition to aim at transient liquid phase bonding, a liquid phase generated due to melting of the powdered brazing filler metal at temperature above the melting point of the powdered brazing filler metal and below the melting point of the plurality of turbine blades, should be isothermally solidified after Cu and Ni in the liquid phase diffuse into the shrouds 21b during temperature holding time and the melting point of the liquid phase increases. Considering that the melting point of TiAl is approximately 1400 to 1500 degrees Celsius and that the melting point of Ti—Cu and Ti—Ni are approximately 900 degrees Celsius, the heating treatment condition is as follows for example.

Heating temperature: 1000 to 1250 degrees Celsius
Holding time: 10 minutes to 10 hours
Degree of vacuum: vacuum higher than $10^{-3}$ Pa Consequently, as shown in FIG. 7C, the joining layers 22 are formed between the two adjacent shrouds 21b through isothermal solidification and cooled thereafter. As a result, a TiAl joined body, in which TiAl as the shrouds 21b are joined, is manufactured.

In the present embodiment as mentioned above, a liquid phase is generated between the shrouds 21b by performing heating in a vacuum furnace for example at temperature above the melting point of the powdered brazing filler metal and below the melting point of the shroud 21b and by using the eutectic reaction of Ti—Cu and Ti—Ni of the powdered brazing filler metal. Diffusion of substances of the liquid phase into the shroud 21b makes it possible to join the shrouds 21b without active pressurizing force. As a result, it is possible to obtain the joint strength equivalent of a base material from room temperature to high temperature of 1050 degrees Celsius by properly taking a heating treatment condition.

That is to say, in the present embodiment, active pressurizing is not necessary by generating a liquid phase between members to be joined. Consequently, for example, joining of materials with the complicated shape which is difficult to be pressurized becomes possible only by inserting paste as insert material between the shrouds of the turbine blades as the members to fit with surfaces to be joined. In addition, three or more turbine blades can be joined at the same time by lining the turbine blades up with the paste being put therebetween. Consequently, a TiAl intermetallic compound, which is difficult to be manufactured as complicated casting parts and forged parts, becomes applicable to complicated structural members.

Any of a sheet-like insert material and pasty insert material shown in the above-mentioned embodiments may be used in accordance with shapes and sizes of members to be joined.

The above-mentioned embodiments, in which a TiAl intermetallic compound is used as a member, can also be applied to a member of Ti alloy.

It is apparent that the present invention is not limited to the above-mentioned embodiment, but may be modified and changed without departing from the scope and spirit of the invention.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A manufacturing method of a TiAl joined body comprising:
    arranging a plurality of members which contains a TiAl intermetallic compound and insert materials which contain Ti as a major element, Cu and Ni such that each of the insert materials is inserted between two adjacent members of the plurality of members;
    heating the plurality of members and the insert materials in a non-oxidizing atmosphere at a temperature above melting points of the insert materials and below melting points of the plurality of members to form a joining layer; and
    cooling the joining layer,
    wherein the joining layer contains a first diffusion layer and a second diffusion layer, and
    wherein each of the first diffusion layer and the second diffusion layer contains Cu of no more than approximately 3 wt % and contains Ni of no more than approximately 3 wt %.

2. The manufacturing method of a TiAl joined body according to claim 1, wherein the heating step is performed without actively applying pressure to the plurality of members.

3. The manufacturing method of a TiAl joined body according to claim 1, wherein each of the insert materials includes one of a lamination material in which Ti foil, Cu foil and Ni foil are laminated, a lamination material in which Ti foil and Cu—Ni foil are laminated and Ti—Cu—Ni foil.

4. The manufacturing method of a TiAl joined body according to claim 3, wherein, in the arranging step, each of the insert materials is pressed by one of the two adjacent members to the other of the two adjacent members by using own weight of the one of the two adjacent members.

5. The manufacturing method of a TiAl joined body according to claim 1, wherein each of the insert materials includes paste which includes a powdered brazing filler metal containing Ti, Cu and Ni.

6. The manufacturing method of a TiAl joined body according to claim 5, wherein, in the arranging step, each of the insert materials is inserted and supported in a predetermined clearance between the two adjacent members.

7. The manufacturing method of a TiAl joined body according to claim 1, wherein each of the plurality of members contains Al of 35 to 55 at. %,
    wherein each of the insert materials contains Cu of 5 to 20 wt % and Ni of 5 to 20 wt %, and
    wherein the heating step is performed in heating temperature of 1000 to 1250 degrees Celsius.

8. The manufacturing method of a TiAl joined body according to claim 1, wherein each of the plurality of members is cylindrically-shaped or ring-shaped.

9. A TiAl joined body comprising:
    a plurality of members configured to contain a TiAl intermetallic compound; and
    joining layers, each of which configured to be formed along a faying surface between two adjacent members of the plurality of members,
    wherein each of joining layers includes:
    a first diffusion layer configured to be formed on a side of one of the two adjacent members, and a second diffusion layer configured to be formed on a side of the other of the two adjacent members,
    wherein the first diffusion layer and the second diffusion layer contain Cu and Ni, and contain at least one of an α-phase Ti-based metal and a β-phase Ti-based metal,
    wherein each of the plurality of members contains Al of 35 to 55 at.%, and
    wherein the highest concentration of each of the Cu and Ni is approximately 2 to 3 wt % in each of the first diffusion layer and the second diffusion layer.

10. The TiAl joined body according to claim 9, wherein each of the first diffusion layer and the second diffusion layer has an acicular structure.

11. The TiAl joined body according to claim 9, wherein a ratio of Cu becomes smaller at a farther portion from the faying surface,
    wherein the ratio of Ni becomes smaller at a farther portion from the faying surface, and
    wherein the ratio of Al becomes larger at a farther portion from the faying surface.

12. The TiAl joined body according to claim 9, wherein each of the plurality of members is cylindrically-shaped or ring-shaped.

13. The manufacturing method of a TiAl joined body according to claim 1, wherein the joining layer includes an α-phase Ti or a β-phase Ti.

* * * * *